United States Patent
Isozaki et al.

(10) Patent No.: US 6,528,577 B2
(45) Date of Patent: Mar. 4, 2003

(54) AQUEOUS POLYURETHANE GEL, PROCESS FOR PRODUCING THE SAME, AND USE THEREOF

(75) Inventors: Osamu Isozaki, Yokohama (JP); Toshiki Noda, Kyoto (JP)

(73) Assignees: Kansai Paint Co., Ltd., Amagasaki (JP); Dai-Ichi Kogyo Seiyaku Co., Ltd., Kyoto (JP)

( * ) Notice: Subject to any disclaimer, the term of this patent is extended or adjusted under 35 U.S.C. 154(b) by 0 days.

(21) Appl. No.: 09/926,783

(22) PCT Filed: Apr. 23, 2001

(86) PCT No.: PCT/JP01/03473
§ 371 (c)(1),
(2), (4) Date: Dec. 19, 2001

(87) PCT Pub. No.: WO01/81442
PCT Pub. Date: Nov. 1, 2001

(65) Prior Publication Data
US 2002/0137839 A1 Sep. 26, 2002

(30) Foreign Application Priority Data

Apr. 25, 2000 (JP) ........................................ 2000-123564
Apr. 28, 2000 (JP) ........................................ 2000-129585

(51) Int. Cl.$^7$ ............................. C08J 3/00; C08K 3/20; C08L 75/00
(52) U.S. Cl. ........................ 524/591; 524/839; 524/840
(58) Field of Search ................................. 524/591, 839, 524/840

(56) References Cited

U.S. PATENT DOCUMENTS 4,118,354 A    10/1978   Harada et al.

FOREIGN PATENT DOCUMENTS

| JP | 47-29490  | 11/1972 |
| JP | 52-99980  | 8/1977  |
| JP | 56-32519  | 4/1981  |
| JP | 61-43678  | 3/1986  |
| JP | 1-249820  | 10/1989 |
| JP | 9-51794   | 2/1997  |

*Primary Examiner*—Patrick D. Niland
(74) *Attorney, Agent, or Firm*—Armstrong, Westerman & Hattori, LLP

(57) ABSTRACT

The present invention provides a polyurethane hydrogel prepared by crosslinking and curing a terminal isocyanate-containing polyurethane resin (C) in the presence of water at a water:resin (C) weight ratio of more than 9:1, the resin (C) being a reaction product of a polyisocyanate (A) and a liquid polyol (B), and the polyol (B) containing 70 wt. % or more of a random copolymer prepared by copolymerization of ethylene oxide (a) and propylene oxide (b) at an ethylene oxide (a): propylene oxide (b) weight ratio of 50:50 to 90:10. The present invention further provides a production process and use of the polyurethane hydrogel.

7 Claims, No Drawings

AQUEOUS POLYURETHANE GEL, PROCESS FOR PRODUCING THE SAME, AND USE THEREOF

TECHNICAL FIELD

The present invention relates to a novel polyurethane hydrogel, a production process and use of the polyurethane hydrogel.

BACKGROUND OF THE INVENTION

Hydrophilic polyurethane resins can be obtained by crosslinking and curing an isocyanate-containing polyurethane resin, i.e., a reaction product of polyol and polyisocyanate, in the presence of water. The hydrophilic polyurethane resins thus obtained are known as hydrogels useful as microorganism carriers, etc. (e.g., Advances in Biochemical Engineering/Biotechnology, Vol. 29).

The above hydrophilic polyurethane resins, however, have drawbacks. Since polyol, one of the starting materials, is a mixture of hydrophilic polyethylene glycol and hydrophobic polypropylene glycol, a solid or highly viscous resin tends to form and it is difficult to mix such resin with water. In addition, since the hydrophilic polyurethane resin lacks uniformity between the hydrophilic and hydrophobic portions, the ability of a hydrogel of the resin to carry microorganisms is insufficient.

Japanese Unexamined Patent Publication No. 51794/1997 discloses a porous carrier suitable for use in bioreactors, which comprises a polyurethane hydrogel having communicating pores. This polyurethane hydrogel is produced by reacting a polyol, e.g., a copolymer of ethylene oxide and propylene oxide, with an isocyanate compound, then reacting the resulting isocyanate-containing polyurethane resin with water at a high concentration of the resin, i.e., at a water:resin weight ratio of about 0.5:1 to 5:1 and adding water to allow the hydrogel to swell with water.

This polyurethane hydrogel, however, has drawbacks. Since the polyurethane hydrogel has a large number of isolated holes and communicating pores, the hydrogel has a specific gravity of less than 1.0. When used as a microorganism carrier, the hydrogel floats in water and can not be efficiently dispersed by stirring, etc. The hydrogel with such a large number of communicating pores and air holes has low strength and the maximum possible volume by swelling with water is 1,000%. In addition, a high concentration is required for the reaction of an isocyanate-containing polyurethane resin with water to produce such porous hydrogel. In this case, pot life after mixing the resin and water is 20 to 30 seconds, and it is difficult to handle the mixture.

DISCLOSURE OF THE INVENTION

An object of the invention is to provide a polyurethane hydrogel free of the problems of the prior art, a production process and use of the polyurethane hydrogel.

Another object of the invention is to provide a polyurethane hydrogel whose volume swelling percentage can be more than 1,000% and which has substantially no voids such as air bubbles or pores, a specific gravity of 1 or more, and high strength and which is suitable as a microorganism carrier or a water retention material, a production process and use of the polyurethane hydrogel.

Other objects and features of the invention will become apparent from the following description.

The present invention provides the following polyurethane hydrogel, production process and use thereof.

1. A polyurethane hydrogel prepared by crosslinking and curing a terminal isocyanate-containing polyurethane resin (C) in the presence of water at a water:resin (C) weight ratio of more than 9:1,
the resin (C) being a reaction product of a polyisocyanate (A) and a liquid polyol (B), and
the polyol (B) containing 70 wt. % or more of a random copolymer prepared by copolymerization of ethylene oxide (a) and propylene oxide (b) at an ethylene oxide (a): propylene oxide (b) weight ratio of 50:50 to 90:10.

2. The polyurethane hydrogel according to item 1 wherein the terminal isocyanate-containing polyurethane resin (C) has a number average molecular weight of about 1,000 to 100,000.

3. The polyurethane hydrogel according to item 1 wherein the terminal isocyanate-containing polyurethane resin (C) is crosslinked and cured in the presence of water at a water:resin (C) weight ratio of 10:1 to 20:1.

4. The polyurethane hydrogel according to item 1 whose volume swelling percentage is more than 1,000%.

5. The polyurethane hydrogel according to item 1 which has substantially no voids and has a specific gravity of 1 or more.

6. The polyurethane hydrogel according to item 1 which has a compressive strength of 0.1 kg/cm$^2$ or more.

7. A process for preparing a polyurethane hydrogel comprising crosslinking and curing a terminal isocyanate-containing polyurethane resin (C) in the presence of water at a water:resin (C) weight ratio of more than 9:1,
the resin (C) being a reaction product of a polyisocyanate (A) and a liquid polyol (B), and
the polyol (B) containing 70 wt. % or more of a random copolymer prepared by copolymerization of ethylene oxide (a) and propylene oxide (b) at an ethylene oxide (a): propylene oxide (b) weight ratio of 50:50 to 90:10.

8. The process according to item 7 wherein the terminal isocyanate-containing polyurethane resin (C) is crosslinked and cured in the presence of water at a water:resin (C) weight ratio of 10:1 to 20:1.

9. A microorganism carrier comprising the polyurethane hydrogel of item 1.

10. A water retention material comprising the polyurethane hydrogel of item 1.

The present inventors carried out intensive research to achieve the above objects and found the following:

(1) The terminal isocyanate group-containing polyurethane resin (C) is liquid-like and easy to mix with water.

(2) When this polyurethane resin is crosslinked and cured in the presence of water at a water:resin weight ratio of more than 9:1, a polyurethane hydrogel whose volume swelling percentage is more than 1,000% can be produced.

(3) Since $CO_2$ generated during crosslinking evaporates out of the system due to the presence of a large amount of water in the system, the hydrogel has substantially no voids such as air bubbles or pores and thus has a specific gravity of 1 or more and high strength.

(4) Since the reaction of polyurethane resin and water occurs at a low concentration of the resin, pot life after mixing the resin and water is about 1 minute or longer. Therefore, it is easy to handle the mixture.

The present invention was accomplished based on these findings.

"Volume swelling percentage" as used herein is defined by the following equation:

Volume swelling percentage (%)=$(V/V_0)\times 100$ in which $V_0$ is the volume of terminal isocyanate-containing polyurethane resin (C) before addition of water; and V is the volume of polyurethane hydrogel formed by addition of water.

Examples of the polyisocyanate (A) of the present invention are compounds conventionally used for production of polyurethane resins and having an average of at least two isocyanate groups, preferably two to four isocyanate groups, per molecule, and a number average molecular weight of about 100 to 2,000.

Specific examples of such polyisocyanate (A) are organic diisocyanates such as hexamethylene diisocyanate, trimethyl hexamethylene diisocyanate and like aliphatic diisocyanates; hydrogenated xylylene diisocyanate, isophorone diisocyanate and like cycloaliphatic diisocyanates; tolylene diisocyanate, 4,4'-diphenylmethane diisocyanate and like aromatic diisocyanates; adducts of such organic diisocyanate and polyalcohols, low molecular weight polyester resins, water or the like; cyclic polymers of two or more of such organic diisocyanates; and isocyanurates and biurets of these organic diisocyanates.

Representative commercially available products usable as polyisocyanate (A) are "Barnock D-750", "Barnock-800", "Barnock DN-950", "Barnock-970" and "Barnock 15-455" (trade names; manufactured by Dainippon Ink & Chemicals, Inc.), "Desmodule L", "Desmodule N", "Desmodule HL", "Desmodule IL" and "Desmodule N3390" (trade names; manufactured by Bayer AG); "Takenate D-102", "Takenate-202", "Takenate-110N" and "Takenate-123" (trade names; manufactured by Takeda Chemical Industries, Ltd.); "Coronate L", "Coronate HL", "Coronate EH" and "Coronate 203" (trade names; manufactured by Nippon Polyurethane Co., Ltd.); and "Duranate 24A-90CX" (trade names; Asahi Chemical Industry Co., Ltd.).

The liquid polyol (B) of the present invention contains 70–100 wt. %, preferably 80–100 wt. %, of a random copolymer prepared by copolymerization of ethylene oxide (a) and propylene oxide (b) at an ethylene oxide (a): propylene oxide (b) weight ratio of 50:50 to 90:10. The weight ratio of ethylene oxide (a) to propylene oxide (b) in the copolymer is preferably within the range of 50:50 to 80:20. Either linear or branched random copolymers can be used. Suitable copolymers include hydrophilic copolymers having an average of at least two alcoholic hydroxyl groups, preferably two to four alcoholic hydroxyl groups, per molecule, a number average molecular weight of about 500 to 50,000 and a hydroxyl equivalent of about 250 to 25,000.

Since liquid polyol (B) is a low viscous liquid at normal temperatures and is easy to handle and readily adjustable with respect to hydrophilicity, it is desirable. Examples of the polyol (B) include random copolymers prepared by copolymerization of ethylene oxide and propylene oxide at the above specified ratio, addition compounds of such random copolymers and the low molecular weight polyols below formed during or after the copolymer production, mixtures of such random copolymers with the low molecular weight polyols below, and mixtures of such random copolymers with polyalkylene glycol.

Examples of such lower molecular weight polyols include ethylene glycol, propylene glycol, diethylene glycol, triethylene glycol, tetraethylene glycol, triethylene glycol, dipropylene glycol, 1,4-butanediol, 1,3-butanediol, 2,3-butanediol, 1,2-butanediol, 3-methy-1,2-butanediol, 1,2-pentanediol, 1,5-pentanediol, 1,4-pentanediol, 2,4-pentanediol, 2,3-dimethyltrimethylene glycol, tetramethylene glycol, 3-methyl-4,3-pentanediol, 3-methyl-4,5-pentanediol, 2,2,4-trimethyl-1,3-pentanediol, 1,6-hexanediol, 1,5-hexanediol, 1,4-hexanediol, 2,5-hexanediol, 1,4-cyclohexanedimethanol, neopentylglycol and like glycols; glycerin, trimethylolpropane, trimethylolethane, trimethylolmethane, diglycerine, triglycerine, 1,2,6-hexanetriol, pentaerythritol, dipentaerythritol, sorbitol, mannitol and alcohols containing 3 or more hydroxyl groups.

By addition of a polyol with 3 or more hydroxyl groups, the final gel product is provided with increased crosslinking density and high strength. However, excessive addition of polyol is not desirable because excessively high crosslinking density results in a low volume swelling percentage. Preferably, the proportion of the polyol with 3 or more hydroxyl groups in the liquid polyol (B) is 10 wt. % or less.

The lower molecular weight polyol may be added to the random copolymer of ethylene oxide (a) and propylene oxide (b).

A polyalkylene glycol such as polyethylene glycol may also be added to the random copolymer of ethylene oxide (a) and propylene oxide (b).

The terminal isocyanate-containing polyurethane resin (C) of the present invention can be synthesized by mixing the polyisocyanate (A) and liquid polyol (B) in such proportions that the isocyanate groups in the polyisocynate (A) are in excess relative to the hydroxyl groups in the liquid polyol (B) and reacting at 10° C. or higher, preferably 20° C. to 200° C., for several minutes to several hours. The resulting resin (C) is usually a transparent solid or highly viscous liquid.

The proportions of the polyisocyanate (A) and liquid polyol (B) are selected so that the molar ratio of isocyanate groups in the polyisocyanate (A) to hydroxyl groups in the liquid polyol (B) will be about 1.01:1 to 2:1, preferably about 1.1:1 to 2:1. If the amount of isocyanate groups is more than 2 moles per mole of hydroxyl groups, a large amount of the polyisocyanate (A) remains unreacted, thus being undesirable. If the amount of isocyanate groups is less than 1.01 mole, the reaction product will have an excessively high molecular weight and gelate, thus being undesirable.

The terminal isocyanate-containing polyurethane resin (C) is not limited with respect to number average molecular weight. Preferably, the resin (C) has a number average molecular weight of about 1,000 to 100,000.

According to the present invention, water is added to the terminal isocyanate-containing polyurethane resin (C) at a water:resin (C) weight ratio of more than 9:1, preferably 10:1 to 20:1, more preferably 12:1 to 15:1, and the mixture is stirred to give a uniform liquid mixture of the resin (C) and a large amount of water. Because the resin (C) crosslinks with part of water in the mixture, a high water content polyurethane hydrogel is obtained. More specifically, by crosslinking and curing the resin (C) in the presence of water at a water:resin (C) weight ratio of more than 9:1, a hydrogel whose volume swelling percentage is more than 1,000% can be produced. The water used may be pure water or may contain water-soluble substances such as salts.

If crosslinking is carried out in the presence of water at a water:resin (C) weight ratio of less than 9:1, hydrogel with a volume swelling percentage of more than 1,000% can not be obtained, even if a large amount of water is added for swelling after crosslinking. In this case, pot life after mixing the resin and water is short and a crosslinking reaction usually starts after 20 to 30 seconds. Therefore, it is difficult to handle the mixture. In addition, the resulting hydrogel has a low specific gravity and low strength because intense foaming causes many air bubbles and communicating pores.

According to the present invention, a liquid mixture of resin (C) and water at a water:resin (C) weight ratio of more than 9:1 usually starts crosslinking and curing after about 1 minute, forming a polyurethane hydrogel. Because of the long pot life of the liquid mixture, a desired shape (e.g., sheet, spherical, cube, rectangle, or cylinder) can be obtained by pouring the mixture into a suitably shaped container and shaping. The mixture can also be formed into a coating film with a thickness of about 100 μm to 10 cm by applying the mixture to a substrate by flow coating or by using a bar coater, a roll coater or the like, then crosslinking, curing and thereafter removing the film from the substrate. Examples of useful substrates include mold releasing substrates such as glass plates and silicon sheets; and sheets or processed products of polyethylene terephthalate, polyvinylchloride, aluminum or the like. If necessary, sheet substrates may be coated on both sides.

In the above shaping process, crosslinking may be accelerated by heating to not higher than 100° C., although satisfactory crosslinking and curing are achieved even at ordinary temperatures.

The hydrogel product thus obtained may be formed into any desired shape by secondary processing such as cutting or crushing. If necessary, the resulting product may be further reshaped.

The polyurethane hydrogel thus obtained has a volume swelling percentage of at least 900%, preferably 1,000% or more, more preferably 1,100% to 2,000%. The hydrogel, which is produced by crosslinking the resin (C) in the presence of a large amount of water, has substantially no voids such as air bubbles or pores because $CO_2$ generated during crosslinking evaporates out of the system. This hydrogel has a specific gravity of 1 or more, preferably about 1.01 to 1.1, is also elastic and has high strength. The compressive strength is usually 0.1 $kg/cm^2$ or more, preferably 1 to 100 $kg/cm^2$.

The polyurethane hydrogel of the invention is suitable for use as a microorganism carrier or a water retention material.

A microorganism carrier made of the hydrogel of the invention is elastic and suitable for attachment of microorganisms. Therefore, a large number of microorganisms or cellular material thereof can be attached. The type of microorganism to be attached to the carrier is not restricted. The carrier can be used for both anaerobic and aerobic microorganisms. The carrier is useful for attaching one or more kinds of microorganisms, for example, mixtures of various organisms such as activated sludge.

Examples of microorganisms include molds such as Aspergillus, Penicillium and Fusarium; yeasts such as Saccharomyces, Phaffia and Candida; and bacteria such as Zymomonas, Nitrosomonas, Nitrobacter, Paracoccus, Vibrio, Methanosarcina and Bacillus.

A simple method for attaching microorganisms to the hydrogel is to place the hydrogel into a fermentor or bioreactor in which the microorganisms have been suspended. It is also possible to attach microorganisms by putting the carrier in a culture medium and then seeding and culturing microorganisms in the medium. After attachment of microorganisms, the carrier may be placed into a bioreactor. Although the amount of the carrier placed into a culture medium, fermentor, or bioreactor is not restricted, a preferred range is usually about 1 to 60 volume % of the medium.

The carrier is most suited for use in fluidized-bed bioreactors or agitation fermentors. It is also possible to use the carrier in fixed-bed bioreactors or fermentors.

A water retention material made of the hydrogel of the invention has high water retention and is thus suitable for various uses.

The water retention material of the invention can be used, for example, as an indoor humidity control material, gardening soil additive, agriculture moisture control material, water culture medium material, and desert afforestation material. In such applications, use of the hydrogel of the invention achieves remarkably long-term uniform water retention, as compared with only the application of water. Therefore, the hydrogel of the invention is highly useful for many purposes.

BEST MODE FOR CARRYING OUT THE INVENTION

The present invention will be described below in more detail with reference to Examples and Comparative Examples.

EXAMPLE 1

One mole of a triol random copolymer (number average molecular weight: 3,000; hydroxyl equivalent: 1,000) of ethylene oxide and propylene oxide (weight ratio of 80:20) branched by glycerin was mixed with 3 moles of tolylene diisocyanate. The mixture was reacted at 80° C. for 10 hours to give a polyurethane resin having three terminal isocyanate functional groups and a number average molecular weight of about 4,000.

Tap water (120 g) was added to 10 g of the above resin and stirred well to give a white turbid liquid of the resin. This liquid of the resin was flow coated over a polyethylene plate to a thickness of 3 mm and allowed to stand at room temperature for 1 hour to give a pudding-like polyurethane hydrogel. This hydrogel had a specific gravity of 1.02, a volume swelling percentage of 1,300% and a compressive strength of 54 $kg/cm^2$.

The hydrogel was cut into 3 mm cubes. The hydrogel cubes were placed into an aerator for waste water treatment in an amount equal to 10 wt. % of the waste water. As a result, nitrification activity, i.e., conversion of nitrogen oxides into nitrate ions, increased to about 2.5 times the activity achieved with only the activated sludge.

EXAMPLE 2

Tap water (110 g) was added to 10 g of the polyurethane resin obtained in Example 1 and the mixture was stirred well to give a white turbid liquid of the resin. This liquid of the resin was flow coated over a polyethylene plate to a thickness of 2 mm and allowed to stand at room temperature for 1 hour to give a pudding-like polyurethane hydrogel. This hydrogel had a specific gravity of 1.05, a volume swelling percentage of 1,300% and a compressive strength of 40 $kg/cm^2$. The hydrogel was cut into 2 mm cubes to give hydrogel cubes.

Subsequently, 100 ml of GY-10 medium (containing 1 g/l of yeast extract and 100 g/l of glucose) and 10 g of the above hydrogel were placed into a 500-ml Erlenmeyer flask. Then Zymomonas mobilis IFO 13756 was added to achieve a concentration of 2 wt. % and cultured statically at 30° C. for 24 hours. After culturing, the surface of the hydrogel was washed with distilled water, the cultured liquid was replaced with a new medium and the medium was cultured statically for another 24 hours. The final culture medium had an ethanol concentration of 6.4 wt. %, indicating that a good amount of alcohol was produced.

EXAMPLE 3

Two moles of hexamethylene diisocyanate was mixed with 1 mole of a diol random copolymer (number average molecular weight: 5,000; hydroxyl equivalent: 2,500) of ethylene oxide and propylene oxide (weight ratio of 70:30). The mixture was reacted at 100° C. for 2 hours to give a polyurethane resin having two terminal isocyanate functional groups and a number average molecular weight of about 5,500.

Tap water (150 g) was added to 10 g of the above polyurethane resin and stirred well to give a white turbid liquid of the resin. This liquid of the resin was flow coated over a polyethylene plate to a thickness of 1 cm. The liquid was allowed to stand at room temperature for 1 hour to give a pudding-like polyurethane hydrogel. This hydrogel had a specific gravity of 1.01, a volume swelling percentage of 1,600% and a compressive strength of 22 $kg/cm^2$. The hydrogel was cut into 1 cm cubes to give hydrogel cubes.

This hydrogel was added to the soil of a potted viola, which is an ornamental plant, in an amount of 25 wt. % of the soil. The viola grew normally even when left for 10 days without water.

COMPARATIVE EXAMPLE 1

For comparison to Example 3, the hydrogel was not added to the soil of a potted viola. The viola withered and almost died when left for 10 days without water.

The polyurethane hydrogel and the production process of the invention have the following outstanding advantages:

(1) A hydrogel which has a volume swelling percentage of more than 1,000% can be obtained.
(2) The hydrogel is a crosslinked gel which contains a large amount of water but has high strength and substantially no voids such as air bubbles or pores.
(3) The hydrogel has a specific gravity of 1 or more, achieves a high dispersion efficiency and reduces power costs for stirring in a water tank.
(4) The terminal isocyanate-containing polyurethane resin, one of the starting materials, is liquid-like and easy to mix with water. Since pot life of the mixture is 1 minute or longer, it is easy to handle the mixture.
(5) The hydrogel has high water content and is thus highly useful as a low-cost microorganism carrier or water retention material.

What is claimed is:

1. A water retention material for use as a material selected from the group consisting of an indoor humidity control material, gardening soil additive, agriculture moisture control material and desert afforestation material, the water retention material comprising a polyurethane hydrogel prepared by crosslinking and curing a terminal isocyanate-containing polyurethane resin (C) in the presence of water at a water: resin (C) weight ratio of more than 9:1, the resin (C) being a reaction product of a polyisocyanate (A) and a liquid polyol (B), and the polyol (B) containing 70 wt. % or more of a random copolymer prepared by copolymerization of ethylene oxide (a) and propylene oxide (b) at an ethylene oxide (a): propylene oxide (b) weight ratio of 50:50 to 90:10.

2. The water retention material according to claim 1 wherein the terminal isocyanate-containing polyurethane resin (C) has a number average molecular weight of about 1,000 to 100,000.

3. The water retention material according to claim 1 wherein the terminal isocyanate-containing polyurethane resin (C) is crosslinked and cured in the presence of water at a water:resin (C) weight ratio of 10:1 to 20:1.

4. The water retention material according to claim 1 wherein the hydrogel has a volume swelling percentage of more than 1,000%.

5. The water retention material according to claim 1 wherein the hydrogel has substantially no voids and has specific gravity of 1 or more.

6. The water retention material according to claim 1 wherein the hydrogel has a compressive strength of 0.1 $kg/cm^2$ or more.

7. The water retention material according to claim 1 wherein the proportions of the polyisocyanate (A) and liquid polyol (B) are selected so that the molar ratio of isocyanate groups in polyisocyanate (A) to hydroxyl groups in liquid polyol (B) is about 1.01:1 to 2:1.

* * * * *